United States Patent
Tanaka

(10) Patent No.: US 12,173,674 B1
(45) Date of Patent: Dec. 24, 2024

(54) FUEL SUPPLY DEVICE FOR GAS FUEL

(71) Applicant: TOYOTA JIDOSHA KABUSHIKI KAISHA, Toyota (JP)

(72) Inventor: Ryo Tanaka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/746,160

(22) Filed: Jun. 18, 2024

(30) Foreign Application Priority Data

Jul. 27, 2023 (JP) ................................. 2023-122503

(51) Int. Cl.
*F02M 37/00* (2006.01)
*F02M 31/02* (2019.01)
*F02M 31/20* (2006.01)

(52) U.S. Cl.
CPC ........ *F02M 37/0017* (2013.01); *F02M 31/02* (2013.01); *F02M 31/20* (2013.01); *F02M 37/0047* (2013.01)

(58) Field of Classification Search
CPC ............... F02M 21/02; F02M 21/0203; F02M 21/0206; F02M 21/0209–0212; F02M 21/0215; F02M 21/0218; F02M 21/0227; F02M 21/023; F02M 21/0248; F02M 31/02; F02M 31/08–107; F02M 31/20
See application file for complete search history.

(56) References Cited

U.S. PATENT DOCUMENTS

| | | | | |
|---|---|---|---|---|
| 5,343,699 A | * | 9/1994 | McAlister | F02M 27/02 123/3 |
| 6,155,212 A | * | 12/2000 | McAlister | F02M 27/02 123/3 |
| 2016/0237960 A1 | * | 8/2016 | Foege | B61C 5/00 |
| 2018/0216577 A1 | * | 8/2018 | Boog | F17C 7/04 |

FOREIGN PATENT DOCUMENTS

| | | | | | |
|---|---|---|---|---|---|
| CN | 103953457 A | * | 7/2014 | | |
| CN | 114109628 A | * | 3/2022 | ........... | F02D 19/023 |
| JP | 6-101572 A | | 4/1994 | | |
| JP | 2017-166424 A | | 9/2017 | | |
| KR | 20100132353 A | * | 12/2010 | | |
| KR | 20160015548 A | * | 2/2016 | | |
| KR | 20220019412 A | * | 2/2022 | | |

* cited by examiner

*Primary Examiner* — John M Zaleskas
(74) *Attorney, Agent, or Firm* — Oblon, McClelland, Maier & Neustadt, L.L.P.

(57) ABSTRACT

A fuel supply device for a gas fuel includes a fuel passage through which the gas fuel is supplied to a fuel injection valve. A heat exchanger is connected to the fuel passage and configured to exchange heat with the gas fuel. The heat exchanger includes a first heat exchanger and a second heat exchanger in which a temperature of a heat medium is lower than that in the first heat exchanger. When an actual temperature of the gas fuel is lower than a target temperature of the gas fuel and a temperature difference between the actual temperature of the gas fuel and the target temperature of the gas fuel is greater than a threshold value, processing circuitry of the fuel supply device executes a process that (Continued)

increases a ratio of an amount of the gas fuel that undergoes heat exchange in the first heat exchanger.

5 Claims, 2 Drawing Sheets

FUEL SUPPLY DEVICE FOR GAS FUEL

CROSS-REFERENCE TO RELATED APPLICATIONS

This application is based upon and claims the benefit of priority from prior Japanese Patent Application No. 2023-122503, filed on Jul. 27, 2023, the entire contents of which are incorporated herein by reference.

BACKGROUND

1. Field

The following description relates to a fuel supply device for a gas fuel.

2. Description of Related Art

Japanese Laid-Open Patent Publication No. 2017-166424 describes an example of a fuel supply device for a gas fuel that includes a tank for storing the gas fuel, a fuel injection valve for supplying the gas fuel to a cylinder of an internal combustion engine, and a fuel passage through which the gas fuel is supplied from the tank to the fuel injection valve. Such a fuel supply device includes one heat exchanger that exchanges heat with the gas fuel flowing through the fuel passage so as to reduce a decrease in the temperature of the gas fuel caused by expansion of the gas fuel and an increase in the temperature of the gas fuel caused by compression of the gas fuel.

A change in the temperature of the gas fuel changes the density of the gas fuel, thereby affecting the precision of the injection amount of the fuel injection valve. Accordingly, a target temperature is set for the gas fuel. Then, the actual temperature of the gas fuel may be controlled to reduce the difference from the target temperature. In this case, it is desired that the difference between the actual temperature of the gas fuel and the target temperature be reduced efficiently.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel supply device for a gas fuel includes a tank that stores the gas fuel, a fuel injection valve configured to supply the gas fuel to a cylinder of an internal combustion engine, a fuel passage through which the gas fuel is supplied from the tank to the fuel injection valve, and processing circuitry. A heat exchanger is connected to the fuel passage and configured to exchange heat with the gas fuel. The heat exchanger includes a first heat exchanger and a second heat exchanger in which a temperature of a heat medium is lower than a temperature of a heat medium in the first heat exchanger. When an actual temperature of the gas fuel is lower than a target temperature of the gas fuel and a temperature difference between the actual temperature of the gas fuel and the target temperature of the gas fuel is greater than a threshold value, the processing circuitry is configured to execute a process that increases a ratio of an amount of the gas fuel that undergoes heat exchange in the first heat exchanger to an amount of the gas fuel that undergoes heat exchange in the heat exchanger to be greater than that when the temperature difference is less than the threshold value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a fuel supply device for a gas fuel will be described with reference to FIGS. 1 and 2.

Fuel System and Controller of Internal Combustion Engine

Figure 1:
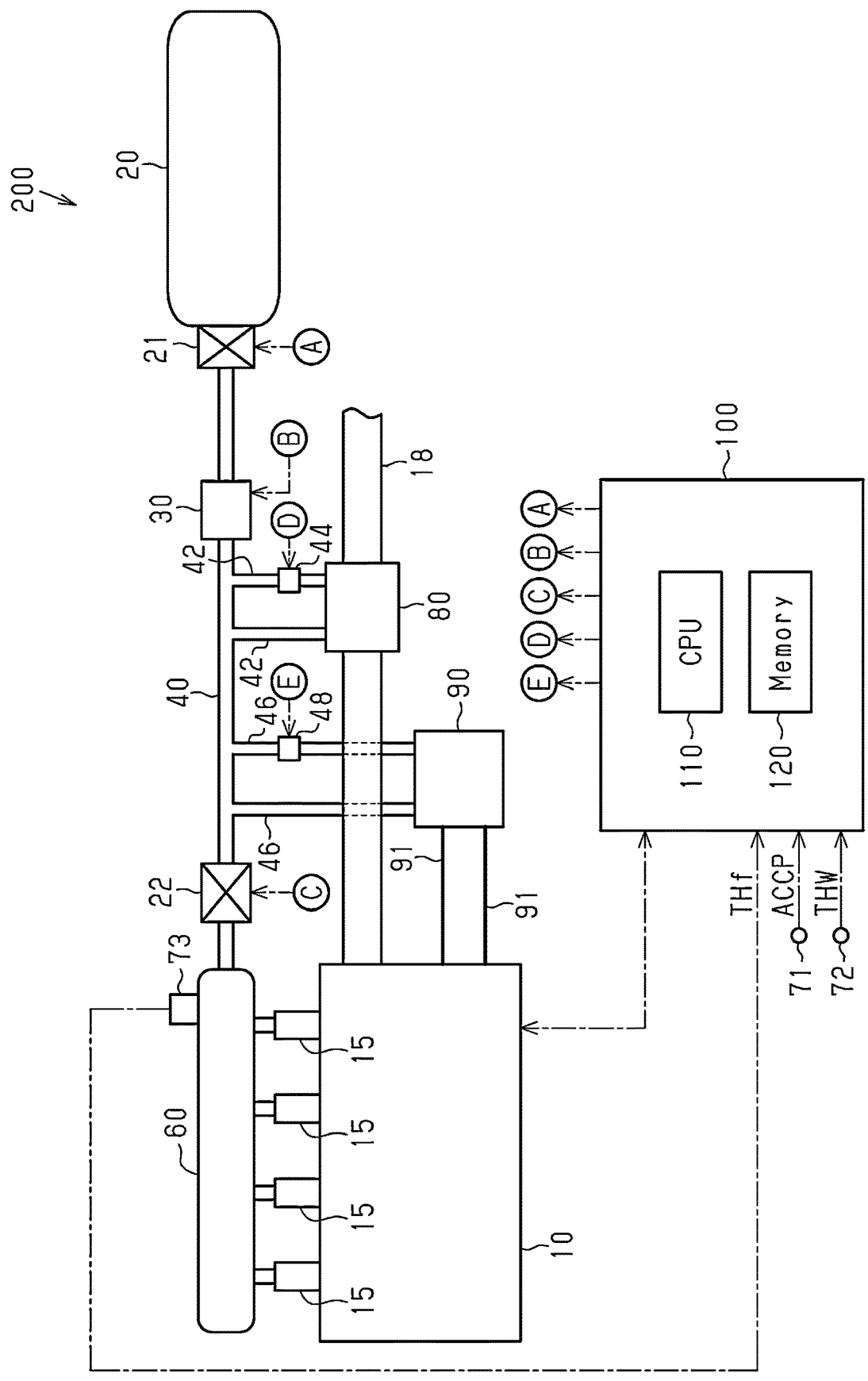
FIG. 1 is a schematic diagram showing a fuel system and a controller of an internal combustion engine in accordance with an embodiment.

An internal combustion engine 10 shown in FIG. 1 uses hydrogen gas, which is a gas fuel, as fuel.

A fuel supply device 200 included in the internal combustion engine 10 includes a fuel injection valve 15, a tank 20, a fuel pipe 40, a first shut-off valve 21, a second shut-off valve 22, a pressure reduction valve 30, and a delivery pipe 60. The fuel pipe 40 forms a fuel passage.

The fuel injection valve 15 supplies fuel to a cylinder of the internal combustion engine 10.

The tank 20 stores hydrogen gas, which is a gas fuel, in a compressed state.

The fuel pipe 40 connects the tank 20 and the delivery pipe 60.

The fuel injection valve 15 is connected to the delivery pipe 60.

The gas fuel stored in the tank 20 is supplied through the fuel pipe 40 and the delivery pipe 60 to the fuel injection valve 15.

The first shut-off valve 21, the pressure reduction valve 30, and the second shut-off valve 22 are arranged in the fuel pipe 40 in this order in a direction of fuel flow.

The first shut-off valve 21 is an electromagnetic valve arranged near an outlet of the tank 20. When the first shut-off valve 21 is open, fuel is supplied from the tank 20 to the fuel pipe 40. When the first shut-off valve 21 is closed, the supply of fuel from the tank 20 to the fuel pipe 40 is stopped.

The pressure reduction valve 30 is an electromagnetic valve that adjusts a fuel pressure, which is the pressure of the hydrogen gas supplied to the fuel injection valve 15, to a pressure that is in accordance with an engine operating state.

The second shut-off valve 22 is an electromagnetic valve arranged near the delivery pipe 60. When the second shut-off valve 22 is open, fuel is supplied to the delivery pipe 60. When the second shut-off valve 22 is closed, the supply of fuel to the delivery pipe 60 is stopped.

The first shut-off valve 21 and the second shut-off valve 22 are maintained in a closed state while the internal combustion engine 10 is inactive. On the other hand, the first shut-off valve 21 and the second shut-off valve 22 are maintained in an open state while the internal combustion engine 10 is active.

A heat exchanger that exchanges heat with the gas fuel is connected to the fuel pipe 40. The heat exchanger includes a first heat exchanger 80 and a second heat exchanger 90 in which a temperature of a heat medium is lower than a temperature of a heat medium in the first heat exchanger 80.

The first heat exchanger 80 is connected to a first circulation path 42 that circulates the gas fuel in the first heat exchanger 80.

The first circulation path 42 is formed by two flow paths branched from a portion of the fuel pipe 40 between the pressure reduction valve 30 and the second shut-off valve 22.

The amount of gas fuel flowing through the first circulation path 42 is adjusted by controlling an open amount of a first valve 44. The first valve 44 is an electromagnetic valve arranged in the first circulation path 42. When the open amount of the first valve 44 is "0" and the first valve 44 is in a fully closed state, the amount of gas fuel flowing through the first circulation path 42 is "0". As the open amount of the first valve 44 increases, the amount of gas fuel flowing through the first circulation path 42 increases. The base value of the open amount of the first valve 44 is "0".

The first heat exchanger 80 is arranged in an exhaust passage 18 of the internal combustion engine 10. The heat medium is exhaust air. The first heat exchanger 80 transfers heat between the exhaust air and the gas fuel. When the temperature of the delivery pipe 60 becomes high due to heat received from the internal combustion engine 10, for example, during high-load operation, the temperature of the gas fuel may greatly exceed the outside temperature. However, the temperature of the gas fuel in the delivery pipe 60 is basically lower than or equal to the outside temperature. Further, when the engine is active, the temperature of the exhaust air is higher than the outside temperature. Thus, the gas fuel is heated in the first heat exchanger 80.

The second heat exchanger 90 is connected to a second circulation path 46 that circulates the gas fuel in the second heat exchanger 90.

The second circulation path 46 is formed by two flow paths branched from a portion of the fuel pipe 40 between the pressure reduction valve 30 and the second shut-off valve 22. The second circulation path 46 is branched from the fuel pipe 40 at a downstream side of the first circulation path 42 in the direction of fuel flow.

The amount of gas fuel flowing through the second circulation path 46 is adjusted by controlling an open amount of a second valve 48. The second valve 48 is an electromagnetic valve arranged in the second circulation path 46. When the open amount of the second valve 48 is "0" and the second valve 48 is in a fully closed state, the amount of gas fuel flowing through the second circulation path 46 is "0". As the open amount of the second valve 48 increases, the amount of the gas fuel flowing through the second circulation path 46 increases. The base value of the open amount of the second valve 48 is "0".

The second heat exchanger 90 is a water-cooled oil catch tank that collects oil in the blow-by gas discharged from the internal combustion engine 10. The second heat exchanger 90 is connected to a water passage 91 that circulates a coolant of the internal combustion engine 10. The heat medium of the second heat exchanger 90 is the coolant of the internal combustion engine 10. The second heat exchanger 90 transfers heat between the coolant and the gas fuel, and between the coolant and the blow-by gas. The temperature of the coolant is basically higher than or equal to the outside temperature. Thus, the gas fuel is heated also in the second heat exchanger 90. However, the temperature of the coolant is lower than the temperature of the exhaust air. Therefore, when the gas fuel is heated by the first heat exchanger 80, the heating rate of the gas fuel is higher than when the gas fuel is heated by the second heat exchanger 90. The temperature of the coolant may become lower than the temperature of the gas fuel, for example, when the temperature of the gas fuel greatly exceeds the outside temperature, as described above, or when the internal combustion engine 10 is being warmed up and the temperature of the coolant has not yet risen. In this case, the gas fuel is cooled in the second heat exchanger 90.

A controller 100 performs various types of controls of the internal combustion engine 10 by controlling various control subjects, such as the fuel injection valve 15, the first shut-off valve 21, the pressure reduction valve 30, the second shut-off valve 22, the first valve 44, the second valve 48, and the like. Such a controller 100 includes a central processing unit (CPU) 110 and a memory 120 formed by a read-only memory (ROM), a random-access memory (RAM), or the like. The CPU 110 executes a program stored in the memory 120 to perform the various types of controls.

The controller 100 refers to various values used to control the internal combustion engine 10. For example, the controller 100 refers to a detection signal of an accelerator position sensor 71 that detects an accelerator operation amount ACCP. The accelerator operation amount ACCP is an operation amount of an accelerator pedal operated by a driver of the vehicle in which the internal combustion engine 10 is installed. Further, the controller 100 refers to a detection signal of a water temperature sensor 72 that detects a coolant temperature THW. The coolant temperature THW is a temperature of the coolant of the internal combustion engine 10. Furthermore, the controller 100 refers to a detection signal of a temperature sensor 73 that detects a fuel temperature THf. The fuel temperature THf is an actual temperature of the gas fuel in the delivery pipe 60. In addition, the controller 100 refers to a detection signal for calculating an engine rotation speed of the internal combustion engine 10, a detection signal of an intake air amount, or the like.

Temperature Control of Gas Fuel

The controller 100 executes the following process when the engine is active so as to efficiently reduce a difference between the actual temperature of the gas fuel and a target temperature.

Figure 2:
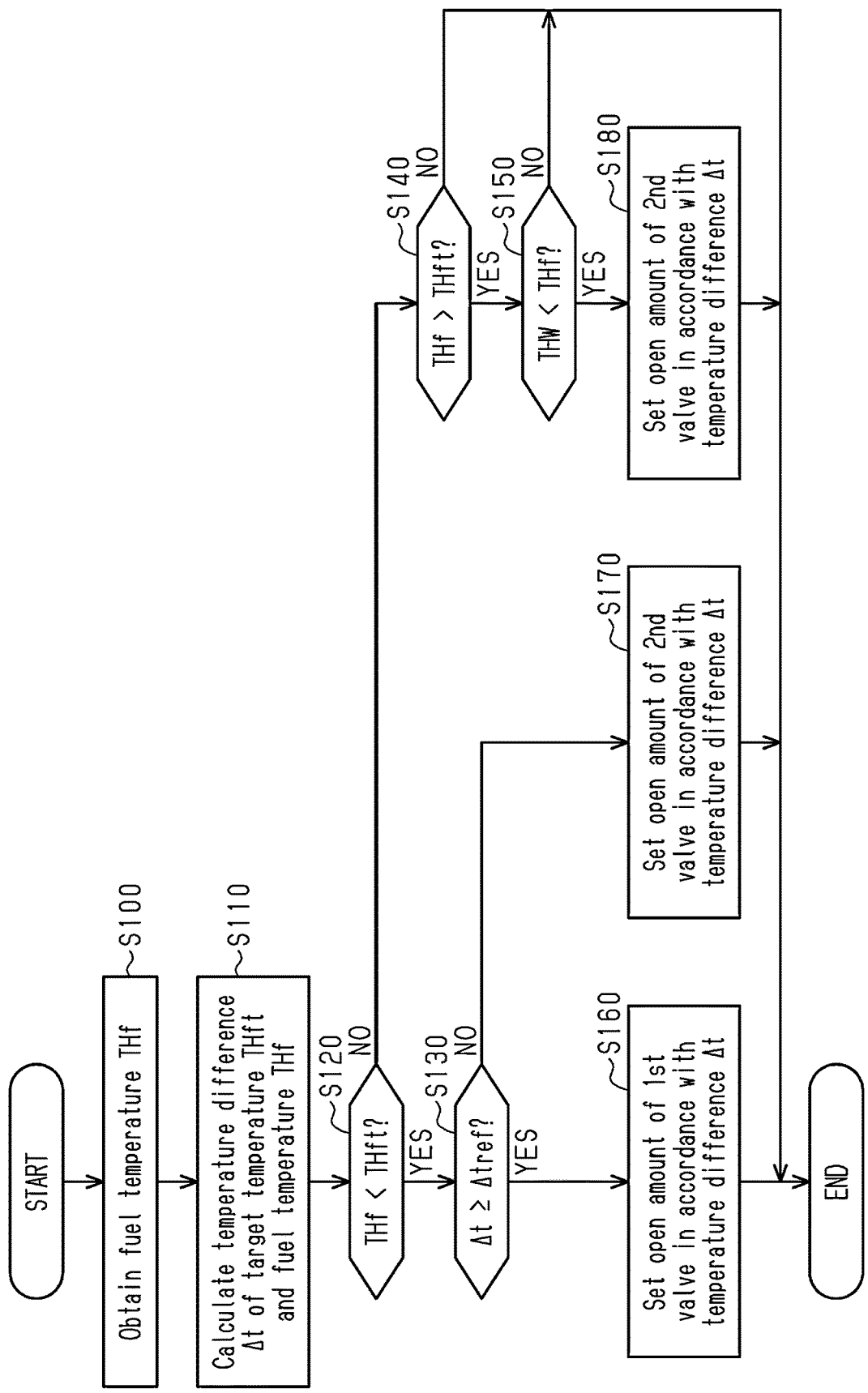
FIG. 2 is a flowchart illustrating a process executed by the controller in accordance with to the embodiment.

FIG. 2 shows a procedure of the process. The process illustrated in FIG. 2 is performed when the CPU 110 repeatedly executes the program stored in the memory 120 of the controller 100 in predetermined intervals. In the following description, the number of each step is represented by the letter S followed by a numeral.

When the process is started, the controller 100 obtains the fuel temperature THf (S100).

Next, the controller 100 calculates a temperature difference Δt of a target temperature THft and the fuel temperature THf (S110). The target temperature THft is a target temperature of the gas fuel in the delivery pipe 60 and is set in advance. As an example, in the present embodiment, the target temperature THft is set to a temperature approximately twenty-five degrees, which is a standard temperature of the outside air. The set value of the target temperature THft may be changed taking into consideration controllability, costs, or the like. The temperature difference Δt is a value obtained by subtracting the fuel temperature THf from the target temperature THft.

Then, the controller 100 determines whether the fuel temperature THf is lower than the target temperature THft (S120). When the controller 100 determines that the fuel temperature THf is lower than the target temperature THft (S120: YES), the controller 100 determines whether the temperature difference Δt is greater than or equal to a threshold value Δtref (S130). The threshold value Δtref is set to a value that allows for an accurate determination of whether there is a need to quickly increase the present fuel temperature THf when the temperature difference Δt is greater than or equal to the threshold value Δtref.

When the controller 100 determines that the temperature difference Δt is greater than or equal to the threshold value Δtref in S130, (S130: YES), the controller 100 sets the open amount of the first valve 44 in accordance with the temperature difference Δt (S160). In S160, the controller 100 sets the open amount of the first valve 44 such that the open amount of the first valve 44 increases as the temperature difference Δt increases. As a result, the amount of the gas fuel that undergoes heat exchange in the first heat exchanger 80 is adjusted to increase as the temperature difference Δt increases. In S160, the controller 100 maintains the open amount of the second valve 48 at the base value of "0".

When the controller 100 determines that the temperature difference Δt is less than the threshold value Δtref in S130, (S130: NO), the controller 100 sets the open amount of the second valve 48 in accordance with the temperature difference Δt (S170). In S170, the controller 100 sets the open amount of the second valve 48 such that the open amount of the second valve 48 increases as the temperature difference Δt increases. As a result, the amount of the gas fuel that undergoes heat exchange in the second heat exchanger 90 is adjusted to increase as the temperature difference Δt increases. In S170, the controller 100 maintains the open amount of the first valve 44 at the base value of "0".

When the controller 100 determines that the fuel temperature THf is higher than or equal to the target temperature THft in S120 (S120: NO), the controller 100 determines whether the fuel temperature THf is higher than the target temperature THft (S140).

When the controller 100 determines that the fuel temperature THf is higher than the target temperature THft (S140: YES), the controller 100 obtains the present coolant temperature THW and determines whether the coolant temperature THW is lower than the fuel temperature THf (S150).

When the controller 100 determines that the coolant temperature THW is lower than the fuel temperature THf in S150 (S150: YES), the controller 100 sets the open amount of the second valve 48 in accordance with the temperature difference Δt (S180). In S180, the controller 100 sets the open amount of the second valve 48 such that the open amount of the second valve 48 increases as the temperature difference Δt increases. As a result, the amount of the gas fuel that undergoes heat exchange in the second heat exchanger 90 is adjusted to increase as the temperature difference Δt increases. In S180, the controller 100 maintains the open amount of the first valve 44 at the base value of "0".

After any one of S160, S170, and S180 is executed, or when a negative determination is given in any one of S140 and S150, the controller 100 ends the present process in the present execution cycle.

Operation

The operation of the present embodiment will now be described.

As the gas fuel in the tank 20 is consumed, the temperature of the gas fuel in the tank 20 is decreased by the decreased pressure in the tank 20. Thus, the temperature of the gas fuel supplied through the delivery pipe 60 to the fuel injection valve 15 is also decreased as the fuel is consumed.

As shown in FIG. 2, the process of S160 is executed when the fuel temperature THf is lower than the target temperature THft (S120: YES) and the temperature difference Δt of the fuel temperature THf and the target temperature THft is greater than or equal to the threshold value Δtref (S130: YES). In S160, that controller 100 executes a process that increases a ratio of the amount of the gas fuel that undergoes heat exchange in the first heat exchanger 80 to the amount of the gas fuel that undergoes heat exchange in the heat exchanger. More specifically, the open amount of the second valve 48 is maintained at "0" in a closed state, and the open amount of the first valve 44 is set in accordance with the temperature difference Δt. As a result, the temperature of the gas fuel is increased using only the first heat exchanger 80.

Advantages

The present embodiment has the following advantages.

(1) When the fuel temperature THf is lower than the target temperature THft (S120: YES in FIG. 2), the heat exchanger heats the gas fuel so that the difference between the fuel temperature THf and the target temperature THft becomes relatively small. When the temperature difference Δt of the fuel temperature THf and the target temperature THft is relatively large (S130: YES in FIG. 2), the ratio of the amount of the gas fuel that undergoes heat exchange in the first heat exchanger 80 to the amount of the gas fuel that undergoes heat exchange in the heat exchanger is increased. In this case, the gas fuel is heated at a rate that is higher than when increasing the ratio of the amount of the gas fuel that undergoes heat exchange in the second heat exchanger 90, in which the temperature of the heat medium is lower than the temperature of the heat medium in the first heat exchanger 80. This efficiently reduces the difference between the fuel temperature THf and the target temperature THft.

(2) When the fuel temperature THf is lower than the target temperature THft (S120: YES in FIG. 2), the heat exchanger heats the gas fuel so that the difference between the fuel temperature THf and the target temperature THft becomes relatively small. When the temperature difference Δt of the fuel temperature THf and the target temperature THft is relatively small (S130: NO in FIG. 2), the ratio of the amount of the gas fuel that undergoes heat exchange in the second heat exchanger 90 to the amount of the gas fuel that undergoes heat exchange in the heat exchanger is increased. More specifically, the open amount of the first valve 44 is maintained at "0" in a closed state, and the open amount of the second valve 48 is set in accordance with the temperature difference Δt. As a result, the temperature of the gas fuel is increased using only the second heat exchanger 90. In this case, the gas fuel is heated at a rate that is lower than when increasing the ratio of the amount of the gas fuel that undergoes heat exchange in the first heat exchanger 80, in which the temperature of the heat medium is higher than that in the second heat exchanger 90. This improves controllability of the temperature of the gas fuel when the amount of the gas fuel that undergoes heat exchange is changed.

(3) When the fuel temperature THf is higher than the target temperature THft (S140: YES in FIG. 2) and the coolant temperature THW, which is the temperature of the heat medium in the second heat exchanger 90, is lower than the fuel temperature THf (S150: YES in FIG. 2) the controller 100 executes S180. That is, the open amount of the first valve 44 is maintained at "0" in a closed state, and the open amount of the second valve 48 is set in accordance with the temperature difference Δt. Thus, only the second heat exchanger 90 exchanges heat with the gas fuel, and the second heat exchanger 90 cools the gas fuel. This reduces the difference between the fuel temperature THf and the target temperature THft even in a situation in which the temperature of the gas fuel is likely to become relatively high.

(4) When the difference between the fuel temperature THf and the target temperature THft is reduced, the temperature of the gas fuel becomes stabilized. This improves the precision of the injection amount from the fuel injection valve 15.

Modified Examples

The above-described embodiment may be modified as follows. The above embodiment and the following modifications can be combined as long as the combined modifications remain technically consistent with each other.

In S160, the open amount of the second valve 48 is maintained at the base value of "0". Alternatively, the open amount of the second valve 48 may be set to a value other than "0" in accordance with, for example, the temperature difference Δt. This modified example also adjusts the open amounts of the first valve 44 and the second valve 48 so as to increase the ratio of the amount of the gas fuel that undergoes heat exchange in the first heat exchanger 80 to the total amount of the gas fuel that undergoes heat exchange in the first heat exchanger 80 and the second heat exchanger 90. This obtains the same effect as the above-described advantage (1).

In S170, the open amount of the first valve 44 is maintained at the base value of "0". Alternatively, the open amount of the first valve 44 may be set to a value other than "0" in accordance with, for example, the temperature difference Δt. This modified example also adjusts the open amounts of the first valve 44 and the second valve 48 so as to increase the ratio of the amount of the gas fuel that undergoes heat exchange in the second heat exchanger 90 to the total amount of the gas fuel that undergoes heat exchange in the first heat exchanger 80 and the second heat exchanger 90. This obtains the same effect as the above-described advantage (2).

In the above embodiment, the heat medium in the second heat exchanger 90 is coolant. The subject of heat exchange by the heat medium is not limited to blow-by gas. The subject of heat exchange by the heat medium may be, for example, a water-cooled intercooler.

The heat medium of the second heat exchanger 90 may be, for example, a lubricating oil of the internal combustion engine 10 that is not water.

The first circulation path 42 may branch from the fuel pipe 40 at a different position. Further, the second circulation path 46 may branch from the fuel pipe 40 at a different position.

The positions of the first circulation path 42 and the second circulation path 46 may be switched. That is, the second circulation path 46 may be branched from the fuel pipe 40 at an upstream side of the first circulation path 42 in the direction of fuel flow.

The gas fuel does not have to be hydrogen gas and may be other type of gas fuel, such as a compressed natural gas.

The controller 100 includes the CPU 110 and the memory 120 and configured to execute software processing. However, this is merely an example. For example, the controller 100 may include a dedicated hardware circuit (such as application specific integrated circuit (ASIC)) that executes at least part of the software processing executed in the above-described embodiment. That is, the controller 100 may be modified to have any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. In other words, the above processes may be executed in any manner as long as the processes are executed by processing circuitry that includes at least one of a set of one or more software circuits and a set of one or more dedicated hardware circuits. The program storage device, which is a computer-readable medium, includes any type of media that is accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel supply device for a gas fuel, the fuel supply device comprising:
  a tank that stores the gas fuel;
  a fuel injection valve configured to supply the gas fuel to a cylinder of an internal combustion engine;
  a fuel passage through which the gas fuel is supplied from the tank to the fuel injection valve; and
  processing circuitry, wherein
  a heat exchanger is connected to the fuel passage and configured to exchange heat with the gas fuel,
  the heat exchanger includes a first heat exchanger and a second heat exchanger in which a temperature of a heat medium is lower than a temperature of a heat medium in the first heat exchanger, and when an actual temperature of the gas fuel is lower than a target temperature of the gas fuel and a temperature difference between the actual temperature of the gas fuel and the target temperature of the gas fuel is greater than a threshold value, the processing circuitry is configured to execute a process that increases a ratio of an amount of the gas fuel that undergoes heat exchange in the first heat exchanger to an amount of the gas fuel that undergoes heat exchange in the heat exchanger to be greater than that when the temperature difference is less than the threshold value.

2. The fuel supply device according to claim 1, wherein when the actual temperature of the gas fuel is higher than the target temperature of the gas fuel and the temperature of the heat medium in the second heat exchanger is lower than the actual temperature of the gas fuel, the processing circuitry is configured to execute a process that performs heat exchange of the gas fuel only in the second heat exchanger.

3. The fuel supply device according to claim 1, wherein the processing circuitry is configured to execute a process that adjusts the amount of the gas fuel that undergoes heat exchange in the heat exchanger in accordance with the temperature difference.

4. The fuel supply device according to claim 1, wherein the heat medium of the first heat exchanger is an exhaust air of the internal combustion engine.

5. The fuel supply device according to claim 1, wherein the heat medium of the second heat exchanger is a coolant of the internal combustion engine.

* * * * *